United States Patent [19]
Nichols

[11] Patent Number: 5,137,112
[45] Date of Patent: Aug. 11, 1992

[54] FALL RESTRAINT LIFELINE ROOF ANCHOR

[76] Inventor: Steve Nichols, 21808 NE. 175th, Woodinville, Wash. 98072

[21] Appl. No.: 761,201

[22] Filed: Sep. 13, 1991

[51] Int. Cl.5 .................. A62B 35/00; F16B 15/06
[52] U.S. Cl. ................................. 182/3; 182/45; 248/237; 411/920
[58] Field of Search .............. 182/90, 45, 3-9; 248/237; 411/920

[56] References Cited

U.S. PATENT DOCUMENTS

| | | | |
|---|---|---|---|
| 471,626 | 3/1892 | Streeter | 182/90 |
| 677,645 | 7/1901 | Elkins. | |
| 742,565 | 10/1903 | Berry. | |
| 1,983,373 | 12/1934 | Horton | 411/920 |
| 2,336,144 | 12/1943 | Wickstrom | 248/237 |
| 3,237,717 | 3/1966 | Jackson. | |
| 3,874,263 | 4/1975 | Barth | 411/920 |
| 4,090,337 | 5/1978 | Szekeres | 411/920 |
| 4,249,713 | 2/1981 | Glynn | 248/237 |
| 5,036,949 | 8/1991 | Crocker | 182/3 |

*Primary Examiner*—Reinaldo P. Machado
*Attorney, Agent, or Firm*—Christensen, O'Connor, Johnson & Kindness

[57] ABSTRACT

A staple is cut from a steel sheet with two parallel legs of rectangular cross section joined at one end by a broader web portion. The staple is driven partway into a roof understructure, leaving the web spaced therefrom to define an aperture for connection of a fall restraint lifeline to the staple which acts as an anchor for the lifeline.

24 Claims, 3 Drawing Sheets

FALL RESTRAINT LIFELINE ROOF ANCHOR

BACKGROUND OF THE INVENTION

1. Field of the Invention

The present invention relates to a special anchor attachable to a wood roof understructure for securing a fall restraint lifeline.

2. Prior Art

Government regulations often require fall restraint or fall arrest systems for roofers. The most stringent regulations cannot always be met practically. For example, compliance with some regulations has required an anchor to which a lifeline is secured capable of withstanding 5,200 pounds of force without separation or structural failure. In common wood frame construction, application of a force of 5,200 pounds could tear apart the roof understructure. In such situations, compliance with the regulations was not possible. As a result, the regulations were not enforced and roofers often were not protected from injury due to falls.

Current regulations have more realistic specifications, such as a 4:1 ratio of anchor strength to roofer weight (including the usual load carried by the roofer) on a roof of moderate pitch. The anchor should withstand 1,120 pounds of force without failure, preferably about 1,200 pounds for a reasonable margin of safety, for a roofer weighing up to about 250 pounds carrying a load of up to about 30 pounds.

Despite the relaxation of government regulations, there is no known inexpensive, reliable, governmentally approved anchor which is easy to install such that it may be used safely in a practical fall restraint system for roofers in wood frame construction.

Glynn et al. U.S. Pat. No. 4,249,713, issued Feb. 10, 1981, discloses a specialized anchor formed of metal sheet material with long flat opposite end portions angled relative to each other to fit over the ridge of a roof understructure with holes for securing such end portions by nailing into aligned rafters at opposite sides of the ridge. The central portion of the anchor is return bent with registered holes for a snap hook to which a lifeline can be attached. At the end of the roofing procedure, Glynn et al. proposed that the central portion be bent over and covered by the ridge cap.

Jackson U.S. Pat. No. 3,237,717, issued Mar. 1, 1966, discloses a complicated safety rigging for roofers in which opposite ends of guidelines are anchored to the ground at opposite sides of a building structure.

Berry U.S. Pat. No. 742,565, issued Oct. 27, 1903, discloses a scaffold supported on an inclined roof by a "Z-shaped hook" which includes one leg hooked over the ridge of the roof.

Similarly, Elkins U.S. Pat. No. 677,645, issued Jul. 2, 1901, discloses a shingler's carriage suspended from special hinged hooks which are affixed to a roof at the ridge.

SUMMARY OF THE INVENTION

The principal object of the present invention is to provide an anchor for a fall restraint lifeline which meets government regulations and will allow a roofer to be safely tethered to it, which can be conveniently and quickly applied in standard wood frame roof construction without requiring special tools or application procedures, which does not require special procedures for extraction so as to allow roofing to continue over it, and which is sufficiently inexpensive so as to be cost effective even for small roofing jobs.

In the preferred embodiment of the present invention, the foregoing object is accomplished by providing an anchor in the form of a special staple having at least two noncircular parallel legs which, in cross section, have abrupt corners, such legs being connected at one end by a broad web portion which allows the staple to be driven into a standard wood frame roof understructure. The legs are sufficiently thick that they may be driven in straight without deformation and be sufficiently resistent to pullout or breakage so as to meet current fall restraint regulations, i.e., capable of withstanding at least about 1,200 pounds of force, but sufficiently thin that they may be driven in without damage to the structural members such as rafters. The web remains spaced outward from the understructure leaving an aperture below the web for quick connection of a standard snap hook or carabiner to which a lifeline is attached. After use in a fall restraint system, the multilegged anchor can be driven the rest of the way into the structural member or its projecting portion can be bent over.

DETAILED DESCRIPTION

Figure 1:
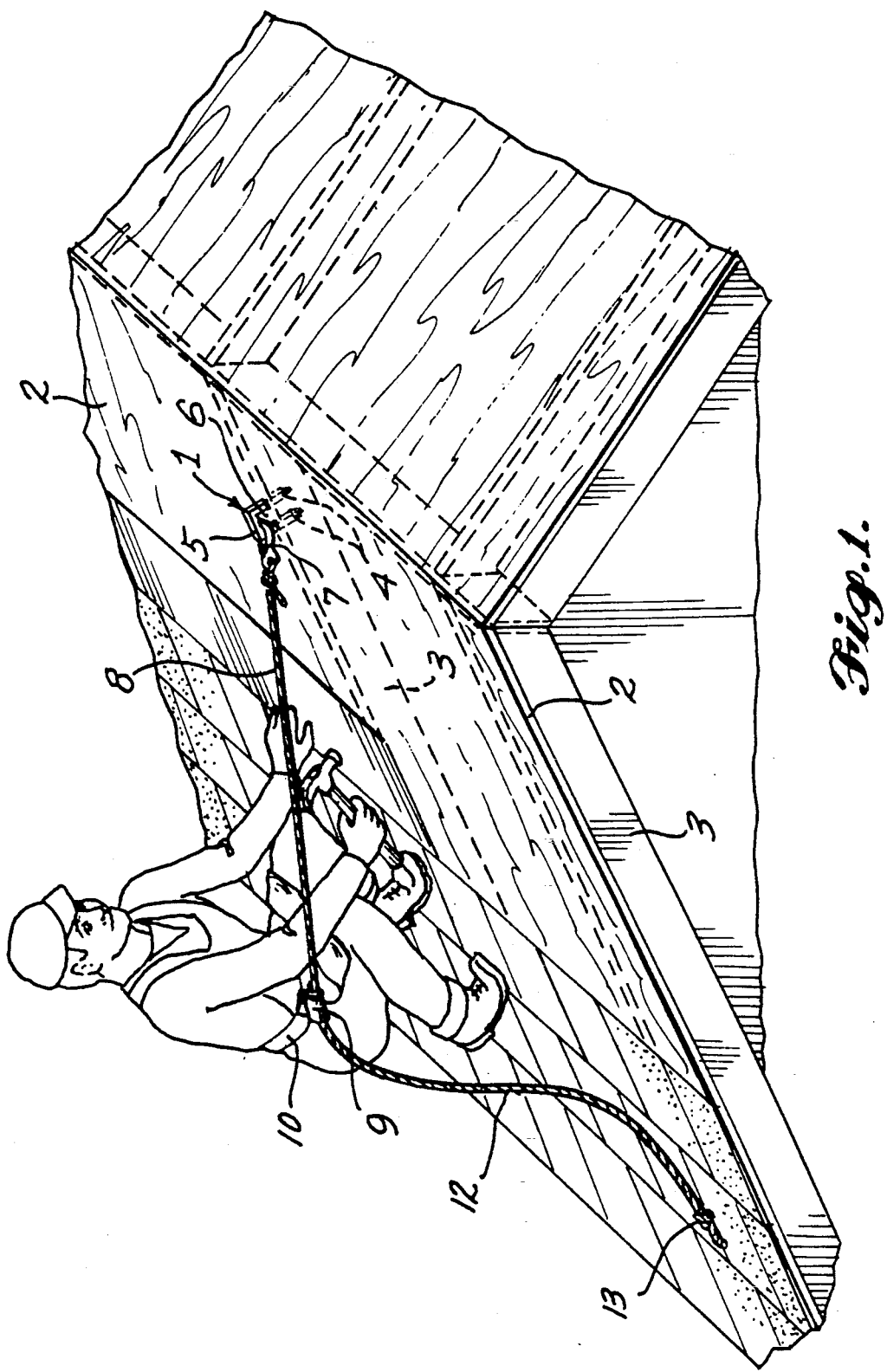
FIG. 1 is a somewhat diagrammatic, fragmentary top perspective illustrating a roofer on a roof with a fall restraint system having an anchor in accordance with the present invention.

FIG. 1 illustrates use of an anchor 1 driven partway into the understructure of a roof. Such understructure includes plywood sheathing 2 supported on rafters 3. Anchor 1 includes spaced parallel legs 4 driven through the sheathing partway into a rafter. Legs 4 are connected by a top web 5 which is spaced above the sheathing so as to leave an aperture 6 for connection of a standard snap hook 7 or a carabiner. A fall restraint lifeline 8 is connected to the snap hook and extends to a suitable rope grab device 9 mounted on a safety belt 10 worn by a roofer. The free end portion 12 of the lifeline can have a stopper knot 13 which limits the maximum amount of travel of the roofer from the anchor and which also limits the maximum amount of slack in the lifeline portion 8. A limit in the maximum slack in the lifeline can be required for the system to qualify as a fall restraint system rather than having to meet the more stringent specifications for a fall arrest system.

Figure 2:
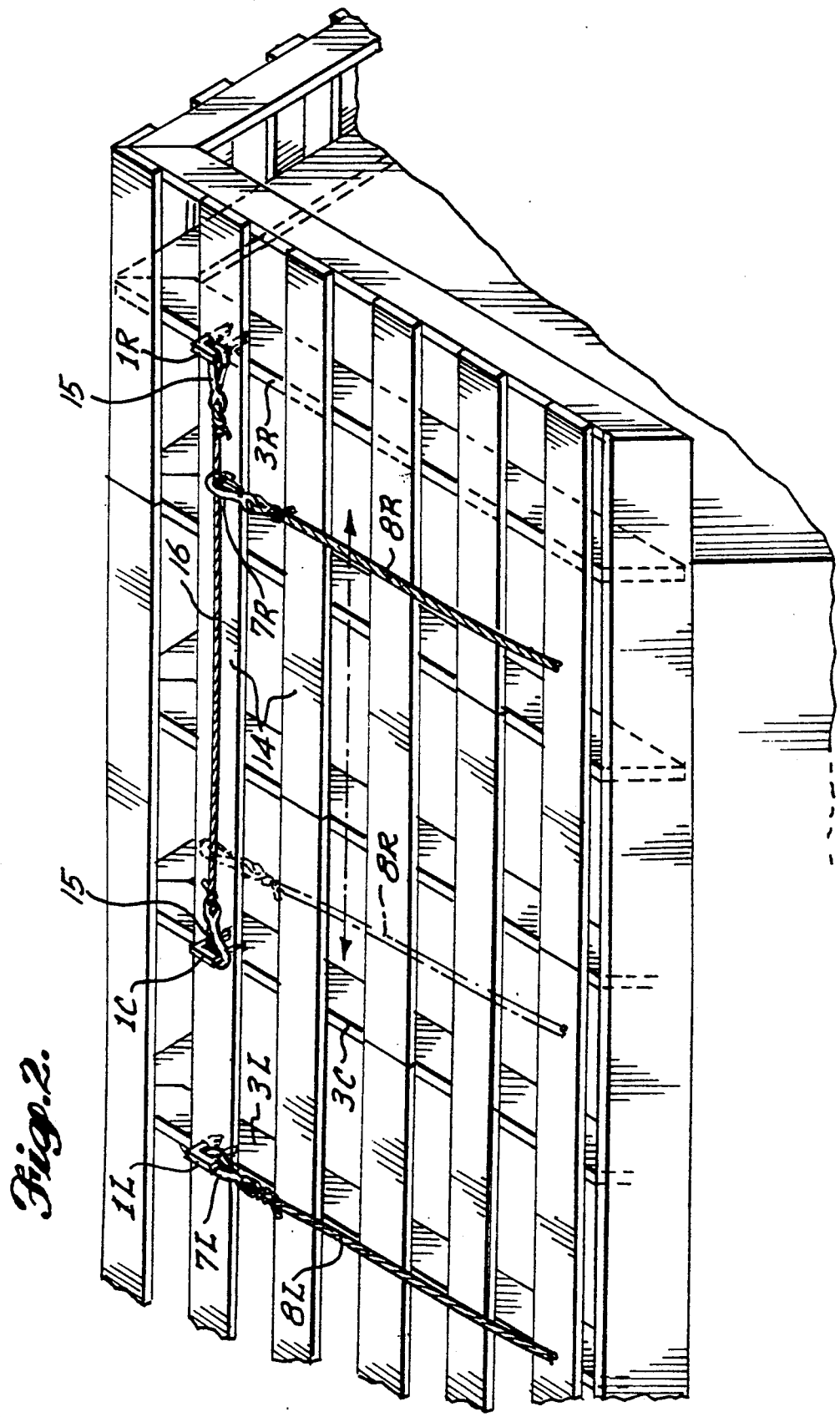
FIG. 2 is a fragmentary perspective of a roof having a different type of understructure with fall restraint systems using anchors in accordance with the present invention.

While FIG. 1 illustrates use of the anchor 1 in accordance with the present invention for a roof understructure having solid sheathing, FIG. 2 illustrates use of such anchor in fall restraint systems for an understructure having skip sheathing of transversely spaced, longitudinally extending boards 14. The anchor 1L at the left is driven centrally through a board 14 into the underlying rafter 3L. In other respects, the fall restraint system using anchor 1L would be identical to the arrangement shown in FIG. 1, including a snap hook 7L and lifeline 8L. For such an arrangement, the anchor 1L could be driven directly into a rafter between adjacent skip sheathing boards 14.

Another complying fall restraint system is illustrated toward the right of FIG. 2 using anchors 1C and 1R driven, respectively, through the same skip sheathing board 14 into different rafters 3C and 3R. Snap hooks or carabiners 15 are secured at opposite ends of a guideline 16 and are connected, respectively, to anchors 1C and 1R. One end of a lifeline 8R extending to a roofer carries a snap hook or carabiner 7R slidable along the length of the guideline 16 for greater freedom of movement of the roofer before having to change the fall restraint setup.

Considerable speculation, research and testing was required in order to discover and prove that an anchor in accordance with the present invention could meet government fall restraint regulations, such as regulations which require an installed anchor to withstand four times the total weight of a roofer tethered to the anchor. Such an anchor should be capable of reliably withstanding 1,200 pounds of force for a reasonable margin of safety for roofers weighing up to 250 pounds with an additional load of about 30 pounds, without pullout or structural failure of the anchor. In addition, it is desirable for the anchor to be capable of being hammered into the understructure, particularly rafters which may be only 1½ inches thick, by use of standard tools and without structural damage to the rafters. The preferred forms developed by the inventor are illustrated in FIGS. 3 through 6.

Standard staples having round legs could be easily driven into the roof understructure without damaging it, but also are easily pulled out and, consequently, not appropriate for a fall restraint anchor. In the embodiment of the present invention shown in FIGS. 3 and 4, the anchor 1 is cut from strong metal sheet material, preferably cold-rolled or heat-treated steel, so as to have legs 4 wider than thick and of noncircular cross section, preferably of rectangular cross section, with abrupt corners 17 making the legs more resistant to extraction. Preferably, the tip of each leg is sharpened to a point 18. The inside and outside edges or faces 19 and 20 preferably are beveled at equal angles and abruptly over a distance much less than the total length of the leg 4 and much less than its distance of insertion into the wood understructure. If beveled unequally, the leg tends to wander as it is driven into the wood understructure, particularly dry rafters, and if beveled over a long distance, the anchor pulls out too easily. Preferably, the free end portion of each leg is beveled or sharpened over about ½ inch.

In addition, if the thickness of the legs is 6/64 inch or less, the legs have a tendency to bend as they are hammered into dry material so that they cannot always be driven in a distance sufficient to meet the pullout force requirements. On the other hand, if the legs are 12/64 inch or greater in thickness, dry rafters of a width of 1½ inches can split or otherwise be structurally damaged which not only damages the roof understructure but also decreases the force required to extract the anchor rendering it unusable if fall restraint regulations are to be met. In the preferred embodiment, the legs are 9/64 inch thick which allows them to be hammered into dry rafters consistently without bending and without splitting the rafters.

The width of the legs is considered to be less critical than the thickness, but preferably the legs are wider than thick. In the preferred embodiment, the legs are approximately ¼ inch wide.

To decrease any tendency of the understructure to split, the legs should be spaced apart at least several times their width. In the preferred embodiment, the distance between the legs is 1½ inches, making the entire anchor about 2 inches wide.

The top web 5 connecting the parallel legs 4 is of the same thickness as the legs if the anchor is cut from steel sheet material, as is preferred. However, in order to prevent undue bending and structural weakening of the web as the anchor is driven into the roof understructure, the web should be substantially wider than the legs. In the preferred embodiment, the width of the top web 5 is at least about 1½ times the width of the legs and several times its thickness. For an anchor 9/64 inch thick and legs ¼ inch wide, the width (i.e., the upright dimension) of the web can be about ⅜ inch.

In order to meet the pullout requirements, the legs should be driven at least about 2 inches into the wood understructure. In the embodiment illustrated in FIGS. 3 and 4, a marking 21 is stamped on each leg illustrating the depth to which the leg should be driven and, in the preferred embodiment, such marking is 2⅜ inches from the sharpened tip 18. It is important that the legs be substantially longer than such depth, however, leaving an aperture of a size sufficient for receiving standard snap hooks and carabiners between the roof sheathing and the underside of the web. In the preferred embodiment, the distance from the markings 21 to the underside of the top web 5 is about ¾ inch.

Figure 3:
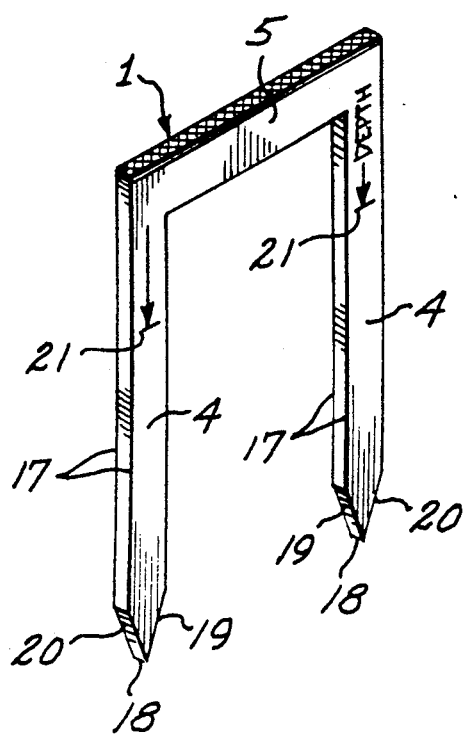
FIG. 3 is a top perspective of a fall restraint lifeline roof anchor in accordance with the present invention.
Figure 4:
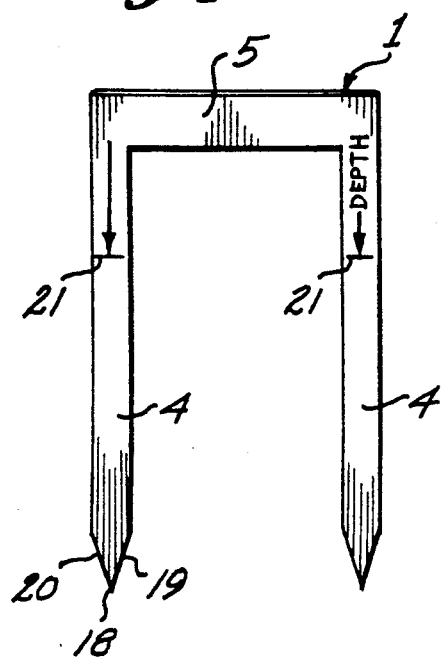
FIG. 4 is a front elevation of such anchor.

Testing has shown that the embodiment of the present invention shown in FIGS. 3 and 4 and described above will withstand substantially more than 1,200 pounds of force without pulling out or breaking. Nevertheless, in some instances failure occurs at higher forces by shearing of the anchor at approximately the location where a leg meets the top web. Such shearing tendency can be reduced by manufacturing the anchor with fillets 22 shown in FIG. 5 at the inner sides of the junctions of each leg 4' to the top web 5'. Such fillets can have a radius of curvature of about ⅜ inch. The result is to increase the average force that must be applied to an installed anchor before failure.

Figure 5:
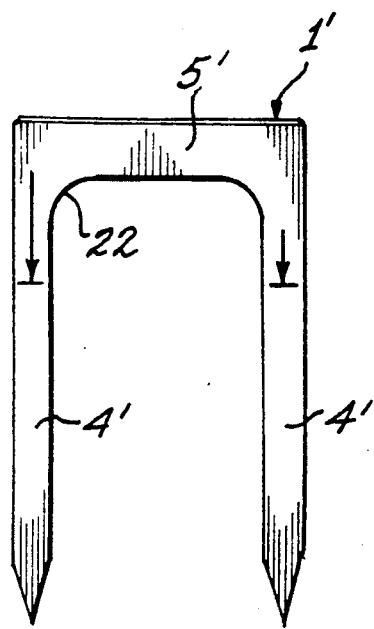
FIG. 5 is a front elevation of a modified form of fall restraint lifeline roof anchor in accordance with the invention.

In all other respects, the anchor 1' shown in FIG. 5 is identical to the anchor 1 shown in FIGS. 3 and 4.

Figure 6:
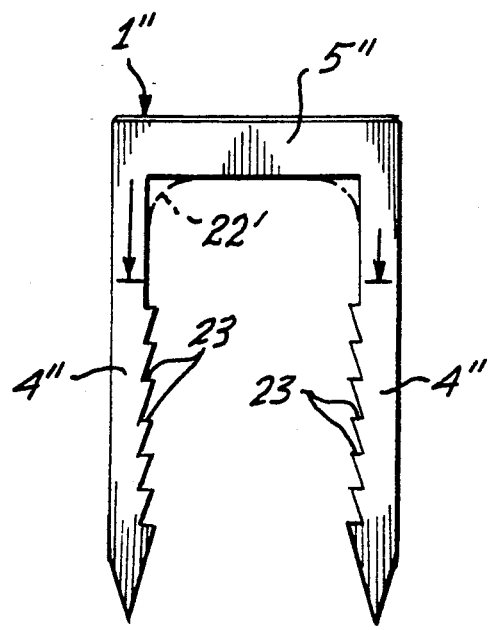
FIG. 6 is a front elevation of another modified form of fall restraint lifeline roof anchor in accordance with the present invention.

In the embodiment shown in FIG. 6, the anchor 1" has been formed with several barbs 23 along the inner face of each leg 4". Prior to testing, it was not known whether the result of such barbs would be to bend the legs outward as they are driven into the roof understructure, or to increase the possibility of damage to the rafter by forcing the legs through a larger section of the wood making the anchor easier to pull out, or to increase the difficulty in driving the anchor into the rafter making it impractical to be applied by use of standard framing hammer, or to increase the pullout force without substantially interfering with convenient installation of the anchor. The result for barbs of the configuration illustrated where beveled inner edges terminate in sharp points projecting inward a distance much less than the maximum width of the legs was to increase the pullout and failure rating. The overall effect of adding the barbs was advantageous, although not necessary to meet current regulations. At higher forces, there was an even greater tendency of the ultimate failure being due to shearing of a leg 4" at its junction with the web 5". Consequently, in the embodiment of FIG. 6, it is desirable to include fillets 22' of the type described with reference to FIG. 5.

In all other respects, the embodiment of FIG. 6 is identical to the previously described embodiments.

The anchor can be installed using a standard framing hammer. Preferably, protective eyewear is worn. Hammer strikes should be applied directly above a leg and not on the web between the legs. Hammer strokes should be directed alternately over the separate legs.

It is important that the anchor be driven centrally into the underlying rafter at a location spaced from the rafter end, preferably at least 2 inches from the rafter end, and at a location free of defects such as splitting, cracking or knots, with no surface contaminants such as oil, grease, chalk, crayon or other substances that might reduce the anchor's ability to resist pullout. On skip sheathing, the anchor may be driven through the central portion of the sheathing into the center of the underlying rafter or, if desired, the anchor may be driven directly into the rafter if the lifeline is to be connected directly to the anchor. If, however, a guideline 16 of the type illustrated in FIG. 2 is to be used (extending between base anchors 1C and 1R), the anchors must be driven through the sheathing rather than being driven directly into the rafters. In the case of spaced anchors driven directly into rafters and supporting a guideline between them, testing resulted in premature structural failure of the rafters which apparently is due to the direction force is applied to the anchors by the snap hooks or carabiners 15 to which the guideline 16 is connected.

Due to the surprisingly high force which would be required to extract the anchors after use, they either must be driven into the roof understructure after use or have their top portions bent over sufficiently so as to not interfere with roofing over them.

I claim:

1. In a fall restraint system including an anchor installed on a roof understructure and a lifeline connected to such anchor, the improvement comprising the anchor being a generally U-shaped metal staple having elongated parallel legs of noncircular cross section with abrupt longitudinally extending corners, said legs having free end portions spaced apart and driven into the roof understructure, said legs further having outer end portions projecting from the roof understructure, the anchor having a web portion connecting said outer end portions of said legs but spaced outward from the roof understructure defining an aperture between said web and the understructure for connection of the lifeline.

2. In the system defined in claim 1, the staple being steel and the legs being of a thickness greater than 6/64 inch.

3. In the system defined in claim 2, the legs being of a thicness less than 12/64 inch.

4. In the system defined in claim 3, the legs being driven at least 2 inches into the roof understructure.

5. In the system defined in claim 1, the legs being substantially wider than thick and being spaced apart at least several times their width.

6. In the system defined in claim 5, the web having a width substantially greater than the maximum width of each of the legs.

7. In the system defined in claim 1, the end portions of the legs remote from the web portion having opposite edges beveled abruptly to a point over a distance much less than the length of the legs.

8. The system defined in claim 1, including rounded fillets at the junctions of the legs to the web portion.

9. In the system defined in claim 1, the legs having inward extending barbs.

10. In the system defined in claim 1, the staple being steel and the legs being of a thickness of about 9/64 inch.

11. In the system defined in claim 1, the end portions of the legs remote from the web portion having opposite edges beveled abruptly to a point over a distance much less than the length of the legs, and the opposite edges of each leg being beveled at equal angles.

12. In the system defined in claim 1, at least one of the legs having an exterior marking for registering with the roof understructure to indicate the length of the leg driven into the roof understructure.

13. In a fall restraint system including an anchor installed on a roof understructure and a lifeline connected to such anchor, the improvement comprising the anchor being a rigid staple including elongated parallel legs having inner and outer end portions, respectively, said inner end portions of said legs being of noncircular cross section with abrupt longitudinally extending corners and being driven into the roof understructure, the anchor having a web portion connecting said outer end portions of said legs and defining an aperture for connection of the lifeline.

14. In the system defined in claim 13, the staple being steel and the legs being of a thickness greater than 6/64 inch.

15. In the system defined in claim 14, the legs being of a thicness less than 12/64 inch.

16. In the system defined in claim 13, the legs being driven at least 2 inches into the roof understructure.

17. In the system defined in claim 13, the legs being substantially wider than thick and being spaced apart at least several times their width.

18. In the system defined in claim 17, the web having a width substantially greater than the maximum width of each of the legs.

19. In the system defined in claim 13, the end portions of the legs remote from the web portion having opposite edges beveled abruptly to a point over a distance much less than the length of the legs.

20. The system defined in claim 13, including rounded fillets at the juntions of the legs to the web portion.

21. In the system defined in claim 13, the legs having inward extending barbs.

22. In the system defined in claim 13, the staple being steel and the legs being of a thickness of about 9/64 inch.

23. In the system defined in claim 13, the end portions of the legs remote from the web portion having opposite edges beveled abruptly to a point over a distance much less than the length of the legs, and the opposite edges of each leg being beveled at equal angles.

24. In the system defined in claim 13, at least one of the legs having an exterior marking for registering with the roof understructure to indicate the length of the leg driven into the roof understructure.

* * * * *